C. H. YOUNG.
DIFFERENTIAL MECHANISM.
APPLICATION FILED MAR. 5, 1918.

1,320,956.

Patented Nov. 4, 1919.

Inventor,
Clifford H. Young.
By Bakewell Church Attys.

UNITED STATES PATENT OFFICE.

CLIFFORD H. YOUNG, OF ST. LOUIS, MISSOURI, ASSIGNOR, BY MESNE ASSIGNMENTS, TO THE AUTO & MOTOR TRUCK AXLE COMPANY.

DIFFERENTIAL MECHANISM.

1,320,956.          Specification of Letters Patent.          Patented Nov. 4, 1919.

Application filed March 5, 1918. Serial No. 220,442.

*To all whom it may concern:*

Be it known that I, CLIFFORD H. YOUNG, a citizen of the United States, residing at St. Louis, Missouri, have invented a certain new and useful Improvement in Differential Mechanisms, of which the following is a full, clear, and exact description, such as will enable others skilled in the art to which it appertains to make and use the same.

This invention relates to differential mechanisms.

One object of my invention is to provide a differential mechanism for motor-driven vehicles, which is so constructed that it will impart a positive drive to both of the wheel axles with which it is used, even though the load or resistance on both wheels is unequal, as, for example, in case one wheel is mired in the mud.

Another object is to provide a gearless differential mechanism of simple construction that is strong, serviceable and inexpensive to manufacture. Other objects and desirable features of my invention will be hereinafter pointed out.

To this end I have devised a differential mechanism which comprises a rotatable driving element that is adapted to be driven by a drive shaft or other suitable means, shafts or wheel axles arranged on opposite sides of said rotatable driving element, and over-running clutches for transmitting movement from said rotatable driving element to said axles, said clutches comprising pinions or toothed wheels on the inner ends of the shafts and coöperating driving pawls or dogs and a controlling means for said pawls constructed in such a manner that one or the other of the pawls will be rendered inoperative when the vehicle on which the differential mechanism is used is traveling in a curved path, said controlling means also being so designed that the act of reversing the direction of rotation of the drive shaft automatically changes the direction of rotation of the pinions and the shafts or wheel axles connected to same.

Figure 1:
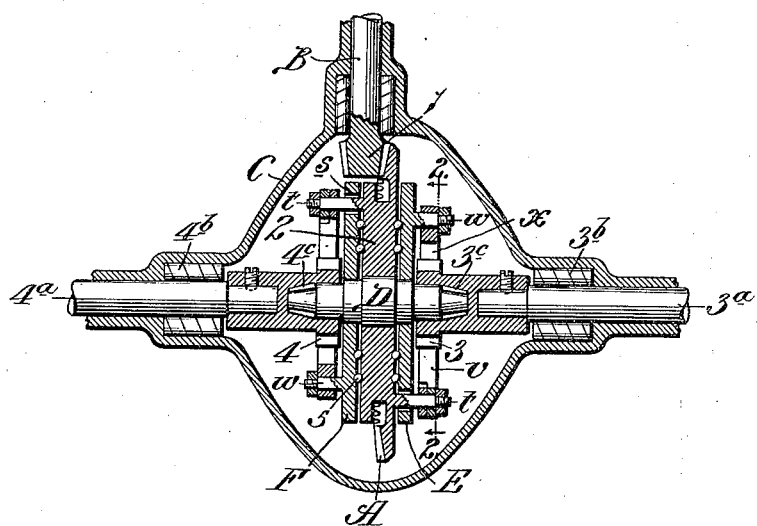
Figure 2:
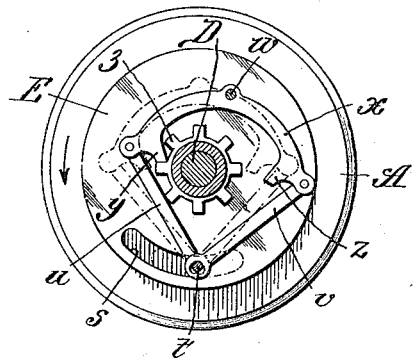

Figure 1 is a horizontal sectional view of a differential mechanism constructed in accordance with my invention; and Fig. 2 is a vertical sectional view, taken approximately on the line 2—2 of Fig. 1.

Referring to the drawings which illustrate the preferred form of my invention, A designates a rotatable driving element that is adapted to be driven by a drive shaft B or other suitable driving means. In the form of my invention herein shown the driving element A consists of a ring gear that meshes with a beveled pinion 1 on the drive shaft B, but I wish it to be understood that it is immaterial, so far as my broad idea is concerned, what said driving element A consists of or what means is employed for operating same. The driving element A is carried by a disk 2 that is arranged intermediate two pinions 3 and 4 that are rigidly connected to the shafts or wheel axles $3^a$ and $4^a$ with which the differential mechanism is used. The axles $3^a$ and $4^a$ are supported at their inner ends by bearings $3^b$ and $4^b$ of any suitable type on the housing C of mechanism, and the pinions 3 and 4, previously referred to, are provided with recessed hubs which receive and support a horizontally-disposed shaft or spindle D that carries the disk 2 to which the driving element A is connected. If desired, the hubs of the pinions 3 and 4 can be provided with roller bearings $3^c$ and $4^c$, or bearings of any other suitable type, in which the end portions of the spindle D turn freely.

The means that I prefer to use for transmitting movement from the driving element A to the pinions 3 and 4 consists of two escapement devices pivotally mounted on disks E and F which, in turn, are loosely mounted on the spindle D at opposite sides of the driving element A and are connected to said driving element, or rather, to the disk 2 that carries same by a slot and pin connection. Each of the escapement devices just referred to is composed of an arcuately-shaped member $x$ provided with two pawls $y$ and $z$ and pivotally connected intermediate its ends to its coöperating disk by means of a pin $w$ that projects laterally from one side of said disk, and a substantially V-shaped element, preferably formed by two links $u$ and $v$ for connecting the ends of the arcuately shaped member $x$ to a pin $t$ that projects laterally from one side of the disk 2 through an elongated slot $s$ in the disk on which the member $x$ is pivotally mounted. When the driving element A is turning in the direction indicated by the arrow in Fig. 2, the pins $t$ on the disk 2 will bear against the ends of the slots $s$ in the disks E and F and hold the members $x$ of the escapement devices in the position shown in full lines in Fig. 2, thereby causing the pawls y on said members x to engage their coöperating pinions 3 and 4, and thus positively drive the axles 3ᵃ and 4ᵃ. When the vehicle turns a corner, or, in other words, starts to travel in an arc, the outside wheel of the vehicle will start to turn faster than the inside wheel of the vehicle, and consequently, will cause the pinion that is associated with said wheel to turn faster than the driving element A, thereby causing the pawl y of the escapement device that coöperates with the outside wheel to move into the position shown in broken lines in Fig. 2. Assuming that the differential mechanism is used on the front axle of a vehicle equipped with a front axle drive or a four-wheel drive, and that the vehicle is turned to the right when it is traveling forwardly, the member x of the escapement device that coöperates with the pinion 3 will move automatically into the position shown in broken lines in Fig. 2 as soon as the outside wheel or left hand front wheel of the vehicle starts to turn faster than the inside wheel, due to the fact that the teeth of the pinion 3 act upon the pawl y, and thus impart a slight forward movement to the disk E on which said member x is mounted. From the foregoing it will be seen that when the vehicle is traveling in an arc the power is applied directly only to the inside wheel, due to the fact that the increase in speed of the outside wheel causes it to become disengaged automatically from the driving mechanism. At such times the pin t on the disk 2 stands at approximately the center of the slot s, but as soon as the former direction of travel of the vehicle is restored, namely, so that it travels in a straight or substantially straight line, the pinion 3 will slow down to approximately the same speed as the driving element A, thereby permitting the pin t on the disk 2 to move to the end of the slot s and move the disk E forwardly sufficiently to draw the pawl y into engagement with one of the teeth of the pinion 3.

When the direction of rotation of the drive shaft B is changed the pins t on the disk 2 of the driving element A will move to the opposite ends of the slots s in the disks E and F, thereby turning said disks E and F sufficiently to cause the pawls z on the members x of the escapement devices to engage the pinions 3 and 4 and turn the shafts 3ᵃ and 4ᵃ in the opposite direction.

A differential mechanism of the construction above described is exceptionally strong and rugged and inexpensive to manufacture, owing to the elimination of the large number of gears and small parts that make up the usual differential mechanism now in general use on motor-propelled vehicles, and another very desirable feature of said mechanism is that it imparts a positive drive to both of the wheels with which it is used, even though one of the wheels is mired in a mud hole. Consequently, such a differential mechanism is well adapted for use on trucks, and particularly on trucks equipped with a front axle drive, owing to the fact that it eliminates the possibility of one of the drive wheels spinning in case the load or resistance on both wheels is not equal or substantially equal. In order to eliminate, as far as possible, any undue friction between the disk 2 and the disks E and F arranged on either side thereof, I preferably provide said disks with a plurality of alining ball races in which are arranged anti-friction balls 5, as shown clearly in Fig. 1.

Having thus described my invention, what I claim, and desire to secure by Letters Patent, is:

1. A differential mechanism, comprising a rotatable driving member, a pair of axles arranged on opposite sides of said member in longitudinal alinement with each other and each provided at its inner end with a toothed wheel, oscillating elements arranged on opposite sides of said driving member and joined to same by a slot and pin connection, a pivotally mounted device on each one of said oscillating elements provided with a pair of rigid pawls, and means whereby rotation of said member in one direction will cause one set of pawls on said devices to engage said toothed wheels and turn the axles in one direction and rotation of said driving member in the opposite direction will cause the other set of pawls on said devices to become operative to turn said axles.

2. A differential mechanism, comprising a pair of axles arranged in longitudinal alinement with each other and mounted in bearings in a housing, a short shaft journaled in the ends of said axles and supported by same, a rotatable driving element supported directly by said shaft, disks mounted on said shaft at opposite sides of said driving element, a slot and pin connection between said disks and said driving element, arcuately-shaped devices pivotally mounted on said disks and each provided with a pair of rigid pawls that are adapted to coöperate with toothed wheels on said axles, and connection between said arcuately-shaped devices and said driving member for moving the pawls on said devices nto and out of engagement with their coöperating toothed wheels.

CLIFFORD H. YOUNG.

Copies of this patent may be obtained for five cents each, by addressing the "Commissioner of Patents, Washington, D. C."